July 6, 1943.   W. H. PLOG   2,323,353
ONE-WAY CLUTCH
Filed Dec. 18, 1940   3 Sheets-Sheet 1

INVENTOR.
WILLIAM H. PLOG
Louis Burgess
ATTORNEY.

July 6, 1943.  W. H. PLOG  2,323,353
ONE-WAY CLUTCH
Filed Dec. 18, 1940  3 Sheets-Sheet 2

INVENTOR.
WILLIAM H. PLOG.
Louis Burgess
ATTORNEY.

July 6, 1943.  W. H. PLOG  2,323,353
ONE-WAY CLUTCH
Filed Dec. 18, 1940  3 Sheets-Sheet 3

INVENTOR.
WILLIAM H. PLOG.
BY Louis Burgess
ATTORNEY.

Patented July 6, 1943

2,323,353

UNITED STATES PATENT OFFICE 2,323,353

ONE-WAY CLUTCH

William H. Plog, Clifton, N. J.

Application December 18, 1940, Serial No. 370,678

10 Claims. (Cl. 192—46)

This invention relates to new and useful improvements in one-way clutches.

One object of the invention comprises inter alia a new and improved construction for one-way clutches or uni-directional direct action drives.

Another object of the invention comprises such clutch or drive or a multiple number thereof as a member or members in a direct action compound drive.

The invention will be more fully understood and these and still further objectives thereof will appear from the following description read in conjunction with the drawings in which Fig. 1 represents a longitudinal section through one member of the compound drive assembly in accordance with the invention;

Figure 1:
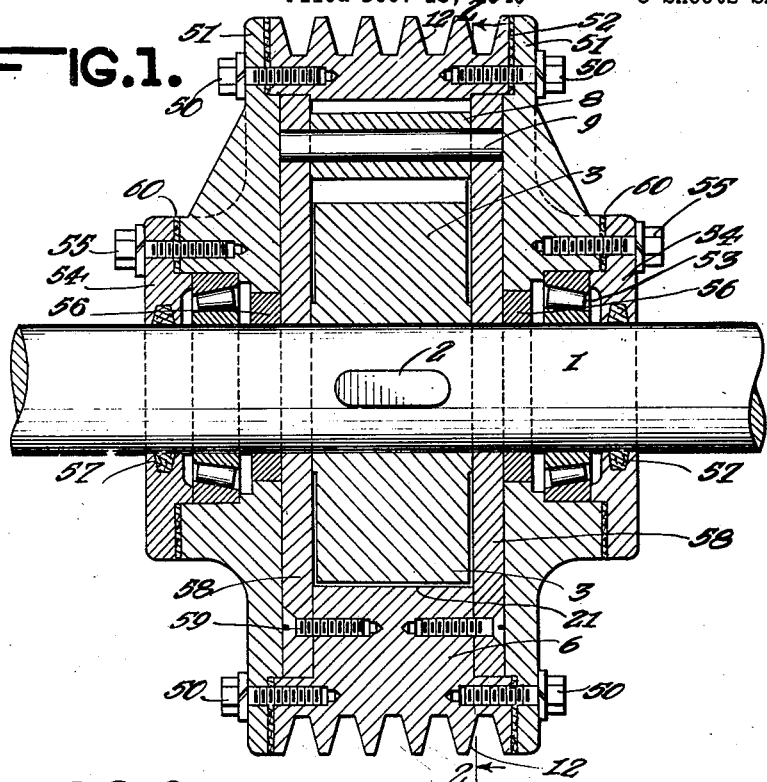
Figure 2:
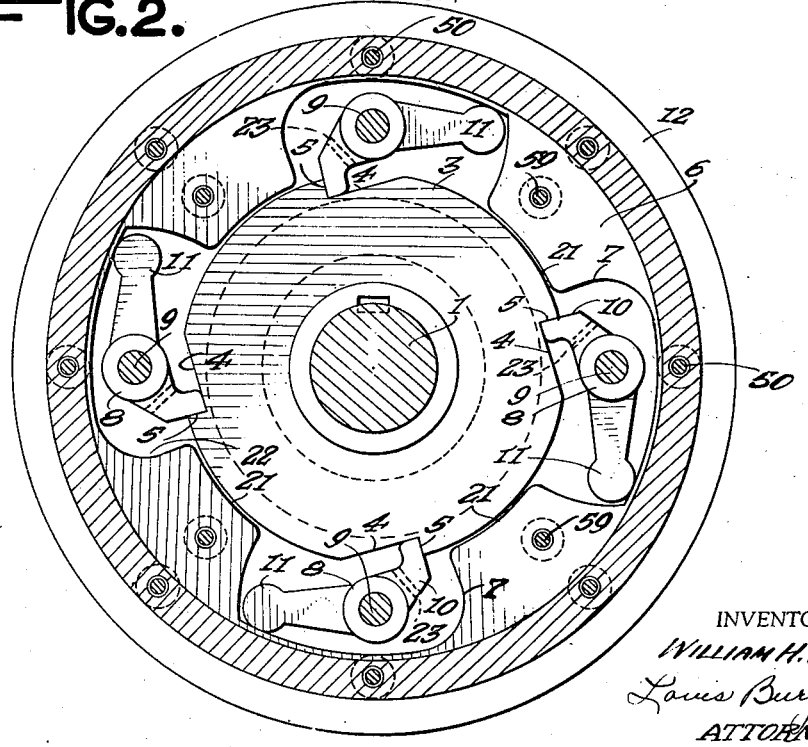
Fig. 2 represents a section through 2—2 of Fig. 1.

In the drawings 1 represents a driven shaft splined by means of a key 2 to the rotary member 3 having cam or impeller surfaces 4, and cam shoulders 5. An outer rotary member 6 is rotatably arranged around the inner rotary member 3. Outer rotary member 6 carries on its inner circumference pockets 7 and in each pocket a lever 8 pivotally attached by means of a pivot pin 9 to rotary member 6. The pockets 7 are substantially filled with a suitable liquid and preferably a lubricating oil having an S. A. E. viscosity of substantially between 10 and 50. The levers 8 each have an engaging end 10 adapted to fit in cooperative relation with the shoulders 5 of the inner rotary member 3. The other non-engaging end 11 of each lever 8 is so constituted that its moment with respect to the pivot point 9 is greater than the moment of the engaging end 10 with respect to that point. The external portion 12 of the outer rotary member 6 is constituted to form a transmission surface of the pulley, sheath gear or sprocket type. A small bore or the like 23 in the engaging end 10 of each lever 8 will serve to facilitate movement of the lever in the oil. The transmission surface 12 is preferably held in position on the outer rotary member by the cap screws 50 clamping the transmission members to the end plates 51. Gaskets 52 are interposed between transmission member 12 and end plate 51. Shaft 1 preferably rides on bearings 53 held in position by the caps 54 attached to the end plate 51 by means of cap screw 55. Retaining rings 58 are clamped to the end plates 51 and outer rotary members 6 by screws 59. Interposed between the retaining rings 58 and the bearings 53 are removable collars 56. Felt rings 57 are provided in the shaft bores of caps 54. Suitable gaskets 60 are provided for between caps 54 and end plates 51.

Figure 6:
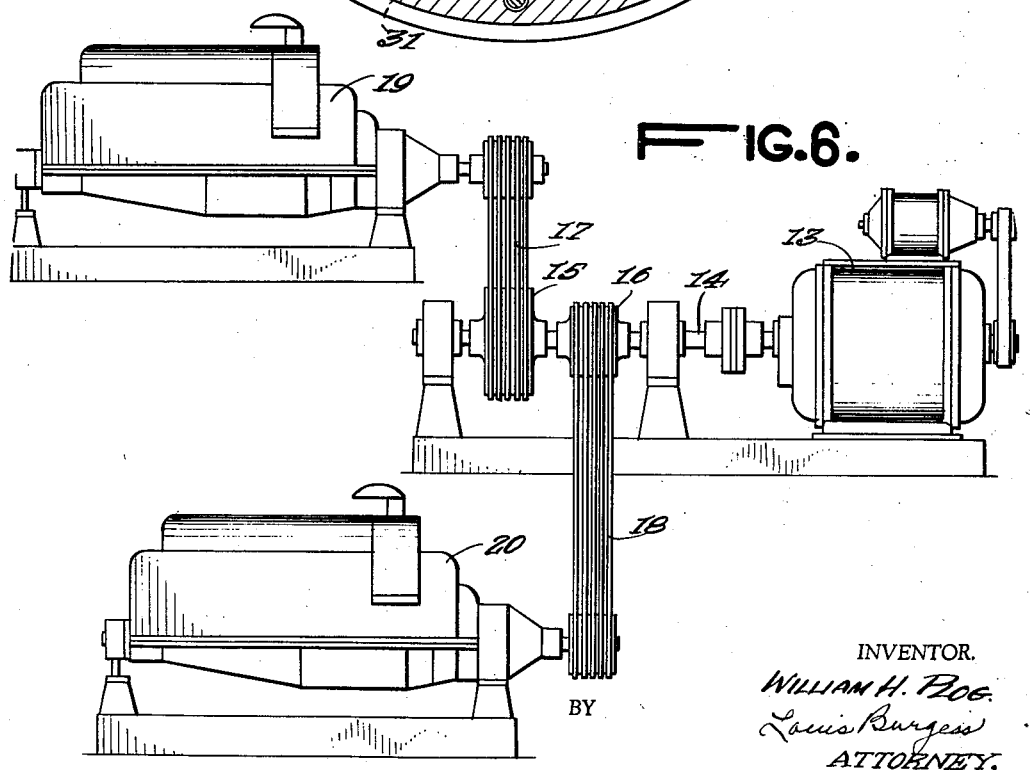
Fig. 6 is an illustration of a practical application of a direct action compound drive in accordance with the invention.

A multiple number of drive assemblies in accordance with the invention are connected in driving relation to the same load, as, for instance, by means of a common driven shaft to which the inner rotary member is suitably connected preferably in direct drive relation as, for example, by splining. Each drive assembly is connected to its own power source. A direct drive construction utilizing two drive assemblies is, for instance, illustrated in Fig. 6 in which a generator 13 is driven by the shaft 14 to which are attached the drive assemblies 15 and 16, connected by means of the belts 17 and 18, respectively, to independent power sources such as the Diesel engines 19 and 20.

Though individually separated oil pockets may be used, I prefer to so space the outer and inner rotary members that a sleeve or channel 21 is formed serving substantially as a direct communication between or extension of the pockets 7. These channels or sleeves serve the circulation of the oil in the pockets.

Figure 3:
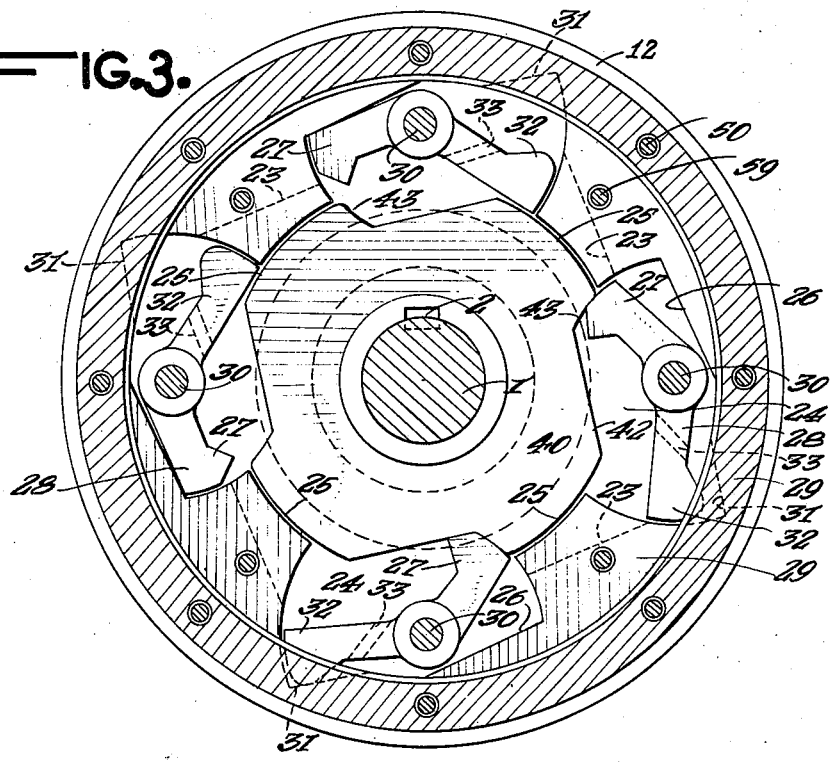
Fig. 3 is a cross-section showing an alternative drive member construction and drive starting positions of levers.
Figure 4:
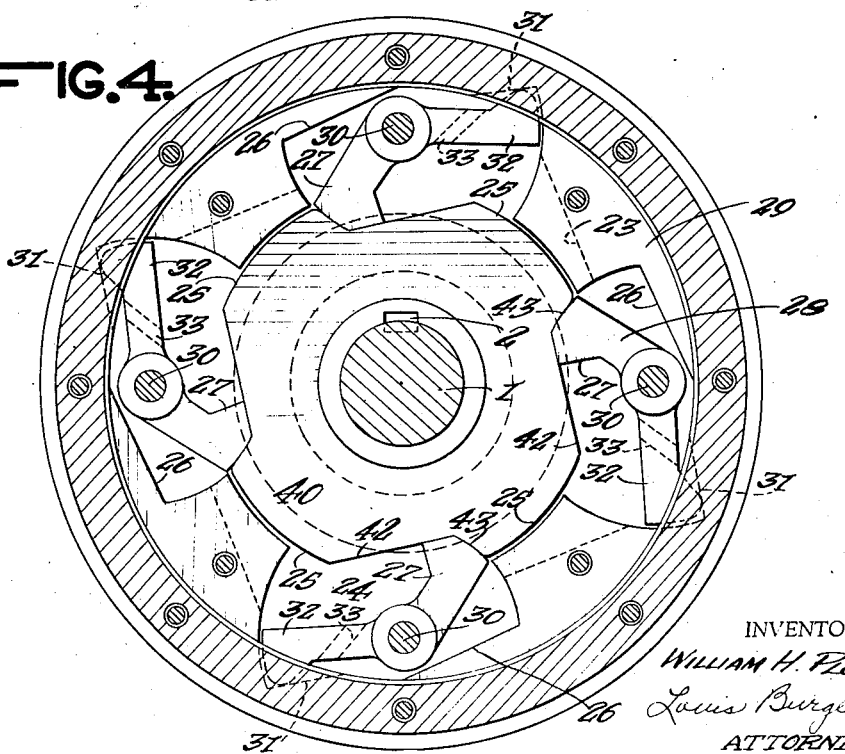
Fig. 4 illustrates the drive member construction of Fig. 3 and driving positions of levers.
Figure 5:
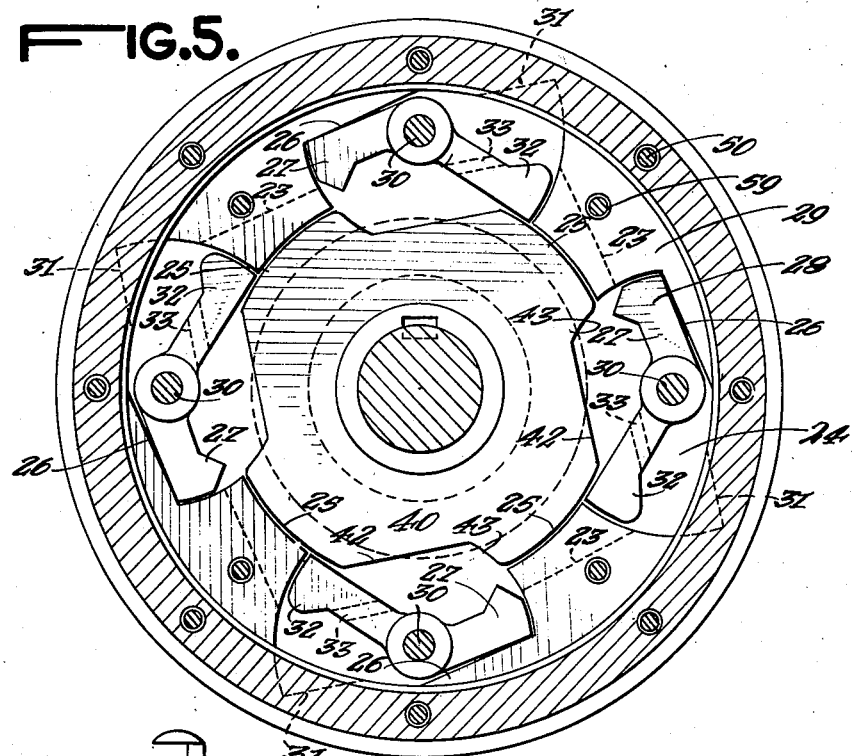
Fig. 5 shows the drive member construction of Fig. 3 and free riding positions of levers.

In the preferred practice of my invention and as a further embodiment thereof, I find it of advantage to use a construction substantially as shown in Figs. 3, 4 and 5. As there illustrated channels 23 interconnect the various pockets 24 in addition to the oil channels or sleeves 25. Each pocket is preferably so constructed that one of its surfaces 26 acts as a stop for the engaging end 27 of lever 28 pivotally attached to the outer rotary member 29 by means of pivot pin 30, when arm 28 is in the suspended non-engaging position (Fig. 5) and another of its surfaces 31 acts as a stop for the non-engaging end 32 of lever 28 when the same is in the engaged position (Fig. 4). Pocket 24 is preferably so constructed that at least the major portion of that part of the pocket overlying the non-engaging end 32 of lever 28 is further removed from the center of rotation of the outer rotary member than the major portion of that part of the pocket overlying the engaging end of lever 28.

In operation, specifically referring to Figs. 3, 4 and 5, as soon as one of the power sources is started and driving power transmitted to the load, the outer rotary member 29 of the drive member connected to said power source is turned at first relatively slowly and as the levers 28 are placed into a position in which gravitational forces will act upon the lever arms having the greater moment to cause the same to pivot in a centrifugal direction, the engaging ends 27 will drop onto the cam surface or surfaces 42 and slide along the same until they engage the shoulder or shoulders 43, whereupon the inner rotary member 40 commences to turn in direct drive relation with its outer rotary member 29. With increasing speed of rotation of the rotary members the engaging ends of all of the levers will be forced into direct driving relation with their corresponding shoulders on the inner rotary member by reason of the centrifugal force acting upon the moment of the non-engaging arms 32 of lever arms 28 which is normally greater with respect to pivot point 30 than the moment of engaging arms 27. Assuming that the load can be satisfactorily handled by one power source, the other, if a double power source compound drive is used, may remain idle. In such case the second drive assembly, i. e., the assembly which connects the second power source to the load rides free and without engagement of the driven means. This is, for instance, illustrated in Fig. 5. With the rotation of the first drive assembly, i. e., the assembly connected to the first power source (Fig. 4), the inner rotary member 40 of the second drive assembly (Fig. 5) is rotated. If a common driven shaft is used for both drive assemblies and if both inner rotary members 40 are connected in direct drive relation to that shaft, the inner rotary member 40 of the first drive assembly (Fig. 4) will be in substantially synchronous rotation with the inner rotary member 40 of the second drive assembly (Fig. 5). As the inner rotary member 40 of the second drive assembly (Fig. 5) rotates, its surface, by reason of its frictional engagement with and the impeller action of the cam surfaces 42 on the oil in the pockets 24, will build up turbulence directionally accentuated, with respect to the engaging ends of levers 28 by the cam or impeller surfaces 42 and centrifugal forces, thereby building up an oil pressure substantially bearing against the engaging ends 27 of levers 28. The engaging ends 27 of the levers of the idling assembly ride with initial rotation of the inner rotary member 40 on the surface thereof, being thereafter, with increased rotation of inner rotary member 40 moved into and held in substantially free riding or suspended position by reason of action of the cam or impeller surface and the impeller induced oil turbulence. In this manner, as long as there exists a differential between the speed of rotation of the inner and outer rotary members with the outer rotary member rotating at a speed anywhere between 0 and a speed less than synchronous with that of the inner rotary member, the levers will be held substantially suspended in the non-engaging position. This suspension is further aided by the cushioning effect of the lubricating medium used for filling the pockets. Oil channels or sleeves 25 act to enhance the action of the oil.

In accordance with the preferred embodiment of the invention, oil channels 23 connect each two of succeeding pockets 24. When levers 28 are in the free riding position (Fig. 5), the oil pockets 24 are supplied with additional oil pressed into the same through the channels 23 by the impeller induced oil turbulence resulting from the differential between rotation speeds of inner and outer rotary members. In this manner a flow of oil is directed, when the levers are in the engaged position, directly and, if preferred, additionally by deflection from the non-engaging ends of the levers, against the engaging ends and, when the levers are in the suspended position, to the portion of the pockets overlying the non-engaging ends of the levers. In the latter case increasing oil pressure bearing against the upper surface of the non-engaging ends of the levers will tend to aid the effective retention of lever suspension.

The second power source may be cut in at any desired time. As soon as this is done, and the outer rotary member 29 of the second drive assembly rotates, it will not be brought into direct driving relation with its inner rotary member 40 until the rotary speed of the outer rotary member substantially approaches or is of substantially the same magnitude as that of the inner rotary member; in this case the oil pressure bearing against the engaging ends of the levers is reduced to a point where centrifugal forces will act upon the non-engaging ends which have a moment in excess of that of the engaging ends, whereby the non-engaging ends are centrifugally moved outwardly, thus bringing the engaging ends into direct driving relation with the shoulders of the inner rotary member. In reversal of this procedure either one of the power sources may be independently cut out at any time. In that case, as soon as the outer rotary member of the drive assembly, connected to the cut-out power source, rotates at a speed less than that of its inner rotary member, the ensuing oil pressure bearing against the under side of the engaging ends of the levers will lift the levers out of their engaging and into substantially free riding position with the inner rotary member as hereinabove described.

For the purpose of facilitating the disengagement of the levers when the differential between rotation of the inner and outer rotary members increases, the under portion of the non-engaging lever arms is preferably substantially flat and smooth so as to furnish maximum deflection, against the inner surface of the engaging part of the levers, of the oil propelled against the surface of the non-engaging lever arm by reason of such differential. Bores or oil channels 33 are preferably provided for in this construction in the non-engaging ends of the levers so as to permit the escape of accumulated oil in the upper portion of the pockets when the levers are brought into engaging position. The side of the non-engaging end of the levers facing the oil channels 23 is preferably so constructed that it blocks the major portion of the oil channels leading to the preceding pocket. The substantially smooth flat under side, i. e., oil deflecting side of the non-engaging portion of the levers, is preferably so constituted that the levers when in suspended position, i. e., resting with their engaging portions against the corresponding stop surfaces of the pockets, extend tangentially from the oil channels or sleeves 25.

The compound drive assembly in accordance with the invention permits the cutting in or out of any number of power sources. The same has the additional advantage that it will automatically synchronize any given number of power sources. The new compound drive further permits the use of machines and engines, the output of which is not completely uniform with respect to the same load; in such cases a temporary lag of one or the other power source will be automatically taken care of by the drive member of that power source.

The foregoing description is for the purpose of illustration and not of limitation, and it is therefore my intention that the invention be limited only by the appended claims or their equivalents wherein I have endeavored to claim broadly all inherent novelty.

I claim:

1. In a direct action compound drive having load driving means and in drive relation thereto at least two direct action drive members, the improvement in at least one of said drive members comprising an inner rotary member drivingly connected to said load driving means and having lever engaging means, an outer rotary member adapted to be drivingly connected to a power source and substantially surrounding said inner rotary member, said outer rotary member carrying a multiple number of levers, each positioned and adapted to engage with one arm thereof one of said engaging means on said inner rotary member, in unidirectional direct drive relation, each of said levers being pivotally attached intermediate its engaging and non-engaging end to said outer rotary member, the moment of said non-engaging end with respect to the pivot point of said lever being greater than the moment of said engaging end with respect to said pivot point, a multiple number of pockets carried by said outer rotary member, each of said levers being set in one such pocket, facing with its open end said inner rotary member and substantially filled with a lubricating liquid of a viscosity sufficient to hold said levers in substantially free riding position as the result of impeller induced directional turbulence in said liquid.

2. In a direct action compound drive having load driving means and in drive relation thereto at least two direct action drive members, the improvement in at least one of said drive members comprising an inner rotary member drivingly connected to said load driving means and substantially circumferentially carrying thereon liquid medium impeller means and a multiple number of lever engaging means, an outer rotary member adapted to be drivingly connected to a power source and substantially surrounding said inner rotary member in rotatable spaced relation thereto, said outer rotary member carrying a multiple number of pockets opening onto its inner circumferential surface, said pockets and space between inner and outer rotary members being filled with a liquid lubricating medium of an S. A. E. viscosity substantially between 10 and 50, each of said pockets carrying a lever having an engaging and a non-engaging end, each lever being pivotally attached intermediate said ends to said outer rotary member, the moment of said non-engaging end with respect to the pivot point of said lever being greater than the moment of said engaging end with respect to said pivot point, said levers being positioned and adapted to engage with their engaging ends said engaging means on said inner rotary member in unidirectional direct drive relation and to be moved into and held in substantially free riding position as the result of impeller induced directional turbulence in said oil.

3. In a direct action compound drive in accordance with claim 2 in which the engaging and non-engaging end of said levers form an obtuse angle with each other and in which each two adjacent pockets are interconnected by channel means for the substantially unrestricted flow of said lubricating oil between adjacent pockets, said channel means being positioned and adapted to direct flow of lubricating oil, when the levers are substantially in the engaged position, substantially directly and by deflection against the under-surface of said engaging end of said lever and, when the levers are substantially in the suspended position, to the portion of said pocket overlying said non-engaging ends of said levers.

4. In a direct action compound drive having load driving means and in drive relation thereto at least two direct action drive members, the improvement in at least one of said drive members comprising an inner rotary member drivingly connected to said load driving means and substantially circumferentially carrying thereon a multiple number of substantially evenly spaced shoulders and a multiple number of liquid medium drive directional impeller surfaces, an outer rotary member adapted to be drivingly connected to a power source and substantially surrounding said inner rotary member in rotatable spaced relation thereto, said outer rotary member carrying pockets, each opening onto the inner circumferential surface of said outer rotary member, said pockets corresponding in number to the number of said shoulders, corresponding portions of each pocket being registerable with corresponding portions of each of said levers, said pockets and space between inner and outer rotary members being substantially filled with a liquid lubricating medium of an S. A. E. viscosity substantially between 10 and 50, each of said pockets carrying a lever having an engaging end and adapted to engage any one of said shoulders in direct drive relation and a non-engaging end, each lever being pivotally attached intermediate said ends to said outer rotary member, the moment of said non-engaging end with respect to the pivot point of said lever being greater than the moment of said engaging end with respect to said pivot point, said levers being positioned and adapted to engage with their engaging ends said shoulders on said inner rotary member in unidirectional direct drive relation and to be moved into and held in substantially free riding position as the result of impeller induced directional turbulence in said oil.

5. In a direct action compound drive in accordance with claim 4 in which the engaging and non-engaging end of said levers form an obtuse angle with each other and in which each two adjacent pockets are interconnected by channel means for the substantially unrestricted flow of said lubricating oil between adjacent pockets, said channel means being positioned and adapted to direct flow of lubricating oil, when the levers are substantially in the engaged position, substantially directly and by deflection against the under-surface of said engaging end of said lever and, when the levers are substantially in the suspended position, to the portion of said pocket overlying said non-engaging ends of said levers.

6. In a direct action compound drive having load driving means and in drive relation thereto at least two direct action drive members, the improvement in at least one of said drive members comprising an inner substantially cylindrical rotary member drivingly connected to said load driving means and having at least four substantially evenly spaced cut-outs, each substantially forming on the surface of said inner rotary drive member a should substantially flush with its cylindrical surface and adjacent to said shoulder a drive directional liquid medium impeller surface, an outer rotary member having an inner substantially cylindrical surface in rotatable spaced relation to the outer surface of said inner rotary member, said outer rotary member carrying pockets, each opening onto said inner cylindrical surface, said pockets corresponding in number to the number of said cut-outs, corresponding portions of each pocket being registerable with corresponding portions of each of said levers, said pockets and space between inner and outer rotary members being substantially filled with a liquid lubricating medium of an S. A. E. viscosity substantially between 10 and 50, each of said pockets carrying a lever having an engaging end and adapted to engage any one of said shoulders in direct drive relation and a non-engaging end, each lever being pivotally attached intermediate said ends to said outer rotary member, the moment of said non-engaging end with respect to the pivot point of said lever being greater than the moment of said engaging end with respect to said pivot point, said levers being positioned and adapted to engage with their engaging ends said shoulders on said inner rotary member in unidirectional direct drive relation and to be moved into and held in substantially free riding position as the result of impeller induced directional turbulence in said oil.

7. In a direct action compound drive in accordance with claim 6 in which the engaging and non-engaging end of said levers form an obtuse angle with each other and in which each two adjacent pockets are interconnected by channel means for the substantially unrestricted flow of said lubricating oil between adjacent pockets, said channel means being positioned and adapted to direct flow of lubricating oil, when the levers are substantially in the engaged position, substantially directly and by deflection against the under-surface of said engaging end of said lever and, when the levers are substantially in the suspended position, to the portion of said pocket overlying said non-engaging ends of said levers.

8. In a direct action compound drive having load driving means and in drive relation thereto at least two direct action drive members, the improvement in at least one of said drive members comprising an inner rotary member drivingly connected to said load driving means and having a substantially cylindrical outer surface with a multiple number of cut-outs, each forming a shoulder substantially flush with said cylindrical surface and adjacent combination cam and drive directional liquid medium impeller surface, substantially recessed in said cylindrical surface, an outer rotary member having an inner substantially cylindrical surface surrounding said outer cylindrical surface in slightly spaced relation thereto, and provided with a multiple number of pockets, each provided with a pivotally attached lever positioned and adapted to engage with one arm thereof counter centrifugally one of said shoulders in direct drive relation, each of said levers being pivotable intermediate its engaging and non-engaging end, the moment of said non-engaging end with respect to the pivot point of said lever being greater than the moment of said engaging end with respect to said pivot point, said pockets and space between outer and inner cylindrical surfaces being filled with a lubricating oil of an S. A. E. viscosity substantially between 10 and 50.

9. In a direct action compound drive in accordance with claim 8 in which each two adjacent pockets are inter-connected by a channel for the unrestricted flow of said lubricating oil between adjacent pockets, said channel being positioned and adapted to direct a flow of lubricating oil against the under-surface of the engaging end of said lever when the lever is in the engaged position and to the portion of said pocket overlying the non-engaging end of said lever when said lever is in the suspended position.

10. A unidirectional direct action drive member comprising an inner rotary member for driving connection with load driving means and having lever engaging means, an outer rotary member adapted to be drivingly connected to a power source and substantially surrounding said inner rotary member carrying a multiple number of levers, each positioned and adapted to engage with one arm thereof, one of said engaging means on said inner rotary member in unidirectional direct drive relation, each of said levers being pivotally attached intermediate its engaging and non-engaging end to said outer rotary member, the moment of said non-engaging end with respect to the pivot point of said lever being greater than the moment of said engaging end with respect to said pivot point, a multiple number of pockets carried by said outer rotary member, each of said levers being set in one such pocket, facing with its open end said inner rotary member and substantially filled with a liquid of a viscosity sufficient to hold said levers in substantially free riding position by impeller induced directional turbulence therein.

WILLIAM H. PLOG.